(12) United States Patent
Lapalu et al.

(10) Patent No.: US 9,238,752 B2
(45) Date of Patent: Jan. 19, 2016

(54) BITUMINOUS COMPOSITION WITH THERMOREVERSIBLE PROPERTIES

(71) Applicants: TOTAL RAFFINAGE MARKETING, Puteaux (FR); UNIVERSITE PIERRE ET MARIE CURIE, Paris (FR)

(72) Inventors: Laurence Lapalu, Villeurbanne (FR); Régis Vincent, Grigny (FR); Laurent Bouteiller, Bourg la Reine (FR); Benjamin Isare, Frevillers (FR)

(73) Assignees: TOTAL RAFFINAGE MARKETING, Puteaux (FR); UNIVERSITE PIERRE ET MARIE CURIE, Paris (FR)

( * ) Notice: Subject to any disclaimer, the term of this patent is extended or adjusted under 35 U.S.C. 154(b) by 205 days.

(21) Appl. No.: 13/946,445

(22) Filed: Jul. 19, 2013

(65) Prior Publication Data
US 2013/0298800 A1  Nov. 14, 2013

Related U.S. Application Data

(62) Division of application No. 12/523,838, filed as application No. PCT/FR2008/000066 on Jan. 18, 2008, now abandoned.

(30) Foreign Application Priority Data

Jan. 23, 2007 (FR) ...................................... 07 00441
Jul. 19, 2007 (FR) ...................................... 07 05225

(51) Int. Cl.
*C08L 95/00* (2006.01)
*C09D 195/00* (2006.01)
*C08K 5/092* (2006.01)
*C08K 5/00* (2006.01)

(52) U.S. Cl.
CPC ............ *C09D 195/00* (2013.01); *C08K 5/0008* (2013.01); *C08K 5/092* (2013.01); *C08L 95/00* (2013.01)

(58) Field of Classification Search
CPC ... C08L 95/00; C08L 2666/66; C09D 195/00; C08K 5/092
See application file for complete search history.

(56) References Cited

U.S. PATENT DOCUMENTS

| | | | |
|---|---|---|---|
| 3,035,930 | A | 5/1962 | Talley |
| 4,145,322 | A | 3/1979 | Maldonado et al. |
| 5,756,565 | A | 5/1998 | Germanaud et al. |
| 5,883,162 | A | 3/1999 | Planche et al. |
| 6,849,581 | B1 | 2/2005 | Thompson et al. |
| 7,446,139 | B2 * | 11/2008 | Martin ............................ 524/68 |
| 2004/0223987 | A1 | 11/2004 | Ferrari |
| 2006/0243163 | A1 * | 11/2006 | Martin ....................... 106/273.1 |
| 2008/0308007 | A1 | 12/2008 | Lapalu et al. |
| 2009/0054562 | A1 * | 2/2009 | Martin ............................ 524/60 |

* cited by examiner

*Primary Examiner* — David M Brunsman
(74) *Attorney, Agent, or Firm* — Harness, Dickey & Pierce, P.L.C.

(57) ABSTRACT

The invention relates to a method of making a theremorevsible bituminous composition. The method includes transferring an additive to a bitumen to form a mixture, and stirring the mixture until its appearance is homogenous. The additive can be an organogelator with general formula R"—(COOH)$_z$, where R" is a linear or branched, saturated or unsaturated chain having 4 to 68 carbon atoms and z is an integer varying from 2 to 4. The bituminous composition is hard at the temperature of use without increasing its viscosity when hot.

15 Claims, 1 Drawing Sheet

BITUMINOUS COMPOSITION WITH THERMOREVERSIBLE PROPERTIES

CROSS-REFERENCE TO RELATED APPLICATIONS

This application is a divisional of U.S. patent application Ser. No. 12/523,838, filed Apr. 13, 2010, which is a National Phase Entry of International Application No. PCT/FR2008/000066, filed on Jan. 18, 2008, which claims priority to French Patent Application No. 07 05225, filed on Jul. 19, 2007 and French Patent Application No. 07 00441, filed on Jan. 23, 2007, all of which are incorporated by reference herein.

TECHNICAL FIELD

The present invention belongs to the field of the bitumens. More specifically, it relates to bituminous compositions comprising an organogelator type additive, the bituminous compositions having thermoreversible viscosity and hardness characteristics. The invention also relates to the use of these bituminous compositions in the fields of highway applications, in particular in the manufacture of road binders, and in the fields of industrial applications. The invention also relates to the method for preparing these bituminous compositions.

TECHNICAL CONTEXT

The use of bitumen in the manufacture of materials for highway and industrial applications has been known for a long time: bitumen is the main hydrocarbon binder used in the field of road construction or civil engineering. To be able to be used as a binder in these different applications, the bitumen must have certain physico-chemical properties. One of the most important properties is the hardness of the bitumen; the latter must be high enough at the temperatures of use to avoid the formation of ruts caused by traffic. Another very important characteristic is the viscosity of the bitumen; the bitumen must be sufficiently fluid at the lowest possible application temperatures. The use of a bituminous binder therefore requires a combination of both the hardness of the bitumen at the temperatures of use and a low viscosity when hot.

PRIOR ART

The bitumens are generally obtained from residues originating from atmospheric and/or vacuum distillation of crude oil, but also after elimination of the light fractions of the native bitumens, asphalts or bituminous sands. In order to adjust the hardness of a bitumen, it is possible to redistill them at very high temperatures or at lower pressure in order to eliminate the light fractions. In fact the more the bitumen is constituted by heavy fractions, the greater its hardness. This technique is not always sufficiently efficient and the heavy fractions are never completely free of light fractions.

Another means for hardening a bitumen is to blow it. Blown bitumens are manufactured in a blowing unit, by passing a flow of air and/or oxygen through an original bitumen. This operation can be carried out in the presence of an oxidation catalyst, for example phosphoric acid. Generally, the blowing is carried out at high temperatures, of the order of 200 to 300° C., for relatively long periods of time typically comprised between 30 minutes and 2 hours, continuously or in batches. This blowing method has a certain number of drawbacks. Firstly, blown bitumens are more susceptible to ageing than the original bitumens. Moreover, the manufacture of blown bitumen requires a blowing installation especially provided for this purpose. One of the major drawbacks of blown bitumens is their viscosity at a given temperature which is greater than that of the original bitumen. Another drawback linked to this high viscosity is the need to heat the blown bitumen to an application temperature greater than that of a non-blown bitumen of the same type, which increases energy expenditure and requires the use of additional protection for the operators.

Another means for hardening a bitumen is to add polymers to it. The Applicant company was one of the first to develop and patent the use of bituminous compositions containing polymers (FR2376188, FR7818534, EP0799280, EP0690892). These polymers make it possible in particular to improve the cohesion of the binder, to improve the elastic properties of the binder, to increase the plasticity range of the bitumen, to increase the resistance to deformation and also to increase the hardness of the bitumen by reducing its penetrability. At the temperatures of use, these characteristics are therefore clearly improved. However when hot the addition of polymers to the bituminous composition generally leads to an increase in the viscosity of the bituminous composition. To be able to be applied to the carriageway, the bituminous binder with added polymers must therefore be heated to an application temperature greater than that of a bituminous binder of equivalent type without polymers. In order to use these polymer bitumens, the same drawbacks are noted as those noted for blown bitumens. The applicant company, in the Patent Application FR2889198, has claimed a chemical blowing method which involves introducing a hardening additive into a bitumen, this additive increasing the hardness of the bitumen at the temperatures of use and limiting the increase in the viscosity when hot.

BRIEF DESCRIPTION OF THE INVENTION

Continuing its work, the applicant company has sought other compounds making it possible to harden the bitumens at the temperatures of use without increasing their viscosity when hot. The applicant company has developed novel bituminous compositions having the characteristics of bitumens hardened by adding polymers at the temperatures of use and not having the characteristics of bitumens with added polymers when hot.

For this purpose, the invention refers to bituminous compositions comprising a major proportion of at least one bitumen and a minor proportion of at least one chemical additive, said chemical additive being an organogelator creating a network of hydrogen bonds between organogelling molecules which have a molar mass of less than or equal to 2000 gmol$^{-1}$, said organogelator comprising at least one hydrogen bond donor D, at least one hydrogen bond acceptor A and at least one compatibilizer C in the bitumen, said compatibilizer C comprising a group chosen from:
- at least one linear hydrocarbon chain comprising at least 4 carbon atoms, or
- at least one aliphatic ring of 3 to 8 atoms, or
- at least one condensed polycyclic system, which is aliphatic or partly aromatic or also wholly aromatic, each ring comprising 5 or 6 atoms, alone or in a mixture.

Preferably, the donor D comprises a heteroatom bearing a hydrogen chosen from nitrogen N, oxygen O and/or sulphur S. Preferably, the donor D is chosen from the alcohol, thiol, phenol, primary amine, secondary amine, quaternary ammonium, amide, urea, hydrazine, carboxylic acid, oxime, hydrazone, imine groups and combinations thereof. Preferably, the acceptor A comprises a heteroatom bearing electronic doublets chosen from oxygen O, sulphur S, nitrogen N and/or phosphorus P. Preferably, the acceptor A is chosen from the C=O, S=O, N=O or P=O groups and the linear or cyclic hydrocarbon groups containing in their hydrocarbon chain a heteroatom of oxygen O, sulphur S, nitrogen N or phosphorus P. Preferably, the acceptor A is chosen from the alcohol, phenol, amide, ester, urea, hydrazine, acid, ketone, aldehyde, lactone, lactame, anhydride, imide, sulphoxide, sulphone, sulphonate, sulphate, sulphite, sulphonic acid, sulphide, ether, phosphine, phosphites, phosphonate, phosphate, nitrite or nitrate groups and combinations thereof.

According to an embodiment, the organogelator excludes the compounds of alkyl amido-imidazolidine and alkyl amido-imidazoline type. According to an embodiment, the organogelator, comprises organogelling molecules of identical chemical structure. According to an embodiment, the organogelator comprises at least one unit of general formula (I):

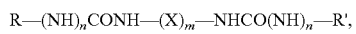

the R and R' groups, identical or different, contain a linear, branched or cyclic, saturated or unsaturated hydrocarbon chain, comprising 1 to 22 carbon atoms, optionally substituted, and optionally comprising heteroatoms, rings and/or heterocycles;

the X group contains a linear, cyclic or branched, saturated or unsaturated hydrocarbon chain, comprising 1 to 22 carbon atoms, optionally substituted, and optionally comprising heteroatoms, rings and/or heterocycles;

n and m are integers having a value of 0 or 1 independently of each other.

Preferably, the organogelator comprises a hydrazide unit when n and m have a value of 0. Preferably, the organogelator comprises two amide units when n has a value of 0 and m has a value of 1. Preferably, the organogelator comprises two urea units when n and m have a value of 1.

According to an embodiment, the R and/or R' group comprises an aliphatic hydrocarbon chain of 4 to 22 carbon atoms, in particular, chosen from the $C_4H_9$, $C_5H_{11}$, $C_9H_{19}$, $C_{11}H_{23}$, $C_{12}H_{25}$, $C_{17}H_{35}$, $C_{18}H_{37}$, $C_{21}H_{43}$, $C_{22}H_{45}$ groups. The X group comprises an aliphatic hydrocarbon chain of 1 to 2 carbon atoms. The X group comprises two rings of 6 carbon atoms linked by a $CH_2$ group, these rings being aliphatic or aromatic.

According to an embodiment, the organogelator comprises at least one unit of general formula (II):

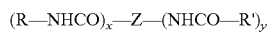

R and R', identical or different, contain a linear, branched or cyclic, saturated or unsaturated hydrocarbon chain comprising 1 to 22 carbon atoms, optionally substituted, and optionally comprising heteroatoms, rings and/or heterocycles, Z represents a tri-functionalized group chosen from the following groups:

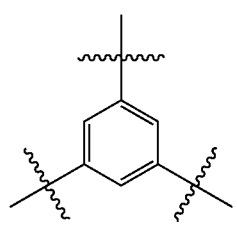

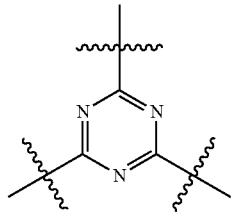

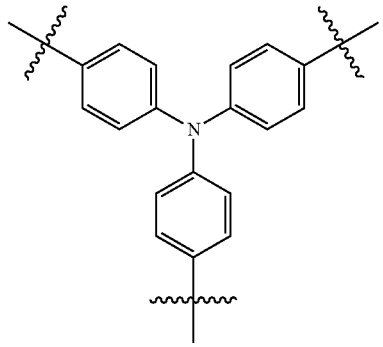

x and y are different integers with a value varying from 0 to 3 and such that x+y=3.

According to an embodiment, the organogelator (III) comprises at least one sorbitol derivative. The sorbitol derivative is a product of the reaction between an aldehyde and D-sorbitol. Preferably, the organogelator is 1,3:2,4-Di-O-benzylidene-D-sorbitol.

According to an embodiment, the organogelator comprises at least one unit of general formula (IV): R"—(COOH)$_z$, with R" a linear or branched, saturated or unsaturated chain comprising 4 to 68 carbon atoms, preferably 4 to 54 carbon atoms, more preferentially 4 to 36 carbon atoms and z an integer varying from 2 to 4.

Preferably, the organogelator is a diacid of general formula HOOC—$C_wH_{2w}$—COOH with w an integer varying from 4 to 22, preferably from 4 to 12 where z=2 and R"=$C_wH_{2w}$. Preferably, the organogelator is a diacid chosen from the following diacids: adipic acid, pimelic acid, suberic acid, azelaic acid, sebacic acid, undecanedioic acid, acid 1,2-dodecanedioic or tetradecanedioic acid.

According to an embodiment, the organogelator comprises at least one unit of general formula (V):

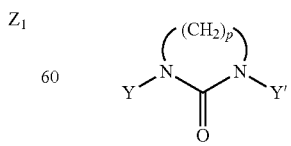

the Y and Y' groups represent independently of each other, an atom or group chosen from: H, —(CH$_2$)q-CH$_3$, —(CH$_2$)q-NH$_2$, —(CH$_2$)q-OH, —(CH$_2$)q-COOH or

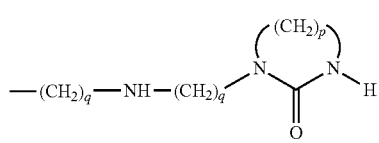

with q an integer varying from 2 to 18, preferably from 2 to 10, preferably from 2 to 4 and p an integer greater than or equal to 2, preferably having a value of 2 or 3.

Preferably, the organogelator has the formula:

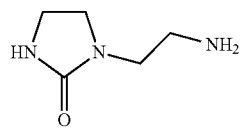

According to an embodiment, the organogelator comprises at least one unit of general formula (VI): R—NH—CO—CO—NH—R'
with R and R', identical or different, which represent a linear, branched or cyclic, saturated or unsaturated hydrocarbon chain, comprising 1 to 22 carbon atoms, optionally substituted, and optionally comprising heteroatoms, rings and/or heterocycles.

According to an embodiment, the organogelator (VII) comprises at least 2 organogelling molecules of different chemical structure, all of the three units A, D and C being found in the organogelator. Preferably, the organogelator comprises an amine derivative and a carboxylic acid derivative. Preferably, the organogelator comprises an aminopyrimidine derivative and a barbituric acid derivative. Preferably, the organogelator comprises a sulphosuccinate derivative and a phenol derivative.

According to an embodiment, the organogelling molecules have a molar mass of less than or equal to 1000 gmol$^{-1}$. According to an embodiment, the organogelator is present from 0.1 to 5% by mass with respect to the bitumen. According to an embodiment, the bitumen also comprises at least one polymer and/or flux. Preferably, the bitumen is chosen from the atmospheric distillation residues, vacuum distillation residues, visbroken residues, blown residues, mixtures and combinations thereof.

The invention also relates to the use of these bituminous compositions in order to produce bituminous binders, in particular anhydrous binders, bituminous emulsions, polymer bitumens or fluxed bitumens. These bituminous binders then being able to be combined with aggregates in order to provide surface dressings, hot mixes, cold mixes, cold-cast mixes, gravel emulsions or wearing courses. The applications of the bituminous compositions according to the invention being able to be used in highway applications or industrial applications such as sealing membranes, membranes or impregnation layers.

The invention finally relates to a method for obtaining a bituminous composition which is hard at the temperatures of use without increasing its viscosity when hot, during which the organogelator can equally well be introduced at a temperature between 140 and 180° C. into the bitumen alone, or during manufacture, into the polymer bitumen, in the bitumen in the form of bituminous binder or into the bitumen when the latter is in the form of an anhydrous binder, in the form of a coated material or a surface dressing. The advantage of the present invention is obtaining bituminous compositions suitable for each envisaged use regardless of the hardness of the bitumen used. Thus the production of a hard bituminous composition depends neither on the nature of the crude oil used, nor on the quantity of light fractions contained in the bitumens used.

DRAWINGS

The drawings described herein are for illustrative purposes only of selected embodiments and not all possible implementations, and are not intended to limit the scope of the present disclosure.

DETAILED DESCRIPTION OF THE INVENTION

Figure 1:
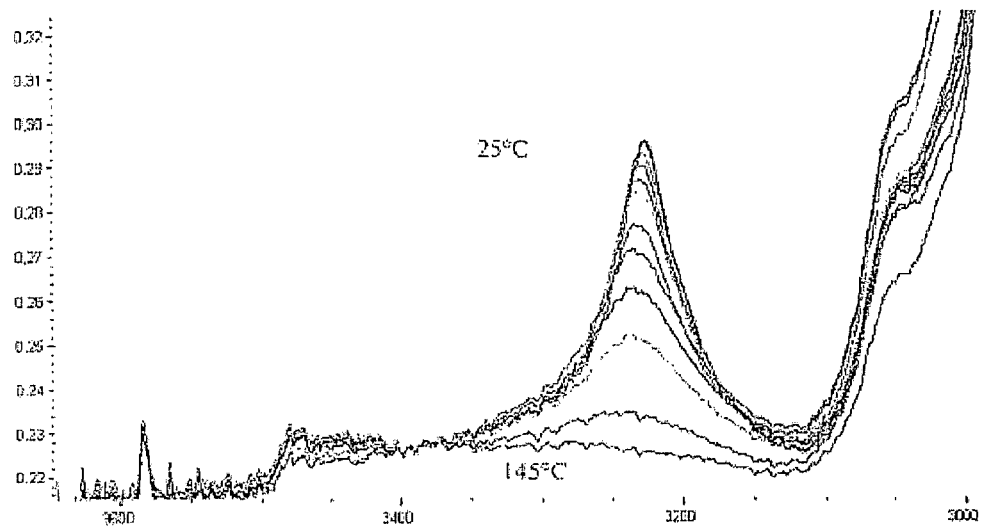
FIG. 1 shows IR spectra of composition $C_6$.

By organogelator within the meaning of the invention, is meant a combination of several so-called organogelling molecules of identical or different chemical structure. In the bitumen, these organogelling molecules are capable of establishing physical interactions with each other leading to auto-aggregation with formation of a 3D supra-molecular network which is responsible for the gelling of the bitumen. The close packing of the organogelling molecules results in the formation of a network of fibrils, immobilizing the molecules in the bitumen.

At the temperatures of use, ranging from 10 to 60° C., the organogelling molecules bind to each other non-covalently, in particular by hydrogen bonds. These hydrogen bonds disappear when the bitumen is heated to a high temperature. Thus at the temperatures of use, the organogelator constituted by a large number of organogelling molecules can be compared to a "supramolecular" polymer and gives the thus-modified bitumen the properties of a standard bitumen/polymer composition, in particular with regard to hardness. At the temperatures of use, the gelling due to the aggregation of the organogelling molecules, causes a thickening of the bituminous medium, leading to an increase in the hardness. The bitumen no longer flows under its own weight, its hardness at the temperatures of use is increased with respect to the original bitumen alone with no organogelling additives. When the bituminous composition is heated, the interactions stabilizing the organogelator disappear, and the bitumen recovers the properties of a bitumen with no additives, the viscosity of the bituminous composition when hot returns to that of the original bitumen.

The physical interactions between organogelling molecules are varied and include in particular hydrogen bond type interactions between a hydrogen bond donor D and a hydrogen bond acceptor A, π interactions between unsaturated rings, dipolar interactions and combinations thereof. The organogelling molecules can establish a single or several types of interactions with neighbouring molecules. The establishment of one or other of these interactions is promoted by the architecture of the organogelling molecules. Within the framework of the invention, the organogelator, constituted by several organogelling molecules, comprises several groups capable of establishing hydrogen bonds. In order to establish these hydrogen bonds, the organogelator comprises at least one hydrogen bond acceptor A, at least one hydrogen bond donor D.

In order to be able to gel and harden the bitumen, the organogelator must be soluble in the bitumen when hot. The main chemical constituents of bitumen are asphaltenes and maltenes. Asphaltenes are compounds, in particular heterocyclic, constituted by a number of polycondensed aromatic rings and naphthene rings. The maltenes are mainly constituted by long paraffin chains. As a result, the organogelator according to the invention comprises at least one chemical group C making the organogelator compatible with the chemical compounds of the bitumen. This compatibilizer C can comprise, alone or in a mixture, a group chosen from: at least one long hydrocarbon chain compatible with the maltene fraction of the bitumen, or at least one aliphatic ring of 3 to 8 atoms, or at least one condensed polycyclic system, which is aliphatic or partly aromatic or wholly aromatic, compatible with the asphaltene fraction of the bitumen, each ring comprising 5 or 6 atoms.

According to a preferred embodiment of the invention, the organogelator comprises as a result at least one hydrogen bond donor D, at least one hydrogen bond acceptor A in order to be able to form hydrogen bonds between organogelling molecules and at least one compatibilizer C in the bitumen comprising at least one linear hydrocarbon chain of at least 4 carbon atoms. This linear hydrocarbon chain therefore comprises at least 4 covalently bound, preferably adjacent carbon atoms. The compatibilizer C makes it possible both to increase the solubility of the organogelator in the bitumen but also to reinforce the interactions between organogelling molecules.

According to another preferred embodiment of the invention, the organogelator comprises at least one hydrogen bond donor D, at least one hydrogen bond acceptor A in order to be able to form hydrogen bonds between organogelling molecules and at least one compatibilizer C in the bitumen comprising at least one aliphatic ring of 3 to 8 atoms. According to another preferred embodiment of the invention, the organogelator comprises at least one hydrogen bond donor D, at least one hydrogen bond acceptor A in order to be able to form hydrogen bonds between organogelling molecules and at least one compatibilizer C in the bitumen comprising at least one condensed polycyclic system, which is aliphatic or partly aromatic or wholly aromatic, each ring comprising 5 or 6 atoms. These polycyclic systems by virtue of their structure provide compatibility with the asphaltene fraction of the bitumen.

According to a preferred embodiment of the invention, the hydrogen bond donor D comprises a heteroatom bearing a hydrogen chosen from nitrogen N, oxygen O and/or sulphur S. According to a preferred embodiment of the invention, the hydrogen bond acceptor A comprises a heteroatom bearing electronic doublets chosen from oxygen O, sulphur S, nitrogen N and/or phosphorus P. Thus, the donor D can be chosen from the alcohol, thiol, phenol, primary amine, secondary amine, quaternary ammonium, amide, urea, hydrazine, carboxylic acid, oxime, hydrazone, imine groups and combinations thereof.

The acceptor A can be chosen from the C=O, S=O, P=O or N=O groups and the linear or cyclic hydrocarbon groups containing in their hydrocarbon chain a heteroatom of oxygen O, sulphur S, nitrogen N or phosphorus P. Preferably, the acceptor A is chosen from the alcohol, phenol, amide, ester, urea, hydrazine, carboxylic acid, ketone, aldehyde, lactone, lactame, anhydride, imide, sulphoxide, sulphone, sulphonate, sulphate, sulphite, sulphonic acid, sulphide, ether, phosphine, phosphite, phosphonate, phosphate, nitrate or nitrite groups and combinations thereof.

According to the invention, the organogelator can contain organogelling molecules all having the same chemical structure. The three units A, D and C are present in each organogelling molecule so that a gel can be formed in the bitumen phase. The organogelators which can be used in the invention are in particular those described in the article by P. Terech and R. G. Weiss "Low molecular mass gelators of organic liquids and the properties of their gels" (*Chem. Rev.* 1997, 97, 3133-3159).

More especially, the organogelator according to the invention can contain organogelling molecules of formula (I) below:

in which:

R and R', identical or different, contain a linear, cyclic or branched, saturated or unsaturated hydrocarbon chain, comprising 1 to 22 carbon atoms, optionally substituted and optionally comprising heteroatoms, rings and/or heterocycles;

X contains a linear, cyclic or branched, saturated or unsaturated hydrocarbon chain, comprising 1 to 22 carbon atoms, optionally substituted and optionally comprising heteroatoms, rings and/or heterocycles;

n and m are integers having independently of each other a value of 0 or 1.

In a variant of the invention, the integer m has a value of 0. In this particular case, the R—(NH)$_n$CONH and NHCO(NH)$_n$—R' groups are covalently bound by a CONH—NHCO hydrazide bond. In this case, the R group or the R' group or both, constitute the compatibilizer C. The R group or the R' group then comprises a group chosen from at least one hydrocarbon chain of at least 4 carbon atoms, at least one aliphatic ring of 3 to 8 atoms, at least one condensed polycyclic system which is aliphatic, partially aromatic or wholly aromatic, each ring comprising 5 or 6 atoms, alone or in a mixture. Preferably, R and R', identical or different, are saturated linear hydrocarbon chains comprising 4 to 22 carbon atoms. Among the preferred saturated linear hydrocarbon chains, there can be mentioned the $C_4H_9$, $C_5H_{11}$, $C_9H_{19}$, $C_{11}H_{23}$, $C_{12}H_{25}$, $C_{17}H_{35}$, $C_{18}H_{37}$, $C_{21}H_{43}$, $C_{22}H_{45}$ groups.

In another variant of the invention, the integer m has a value of 1. In this case, the R group, the R' group and/or the X group constitute the compatibilizer C. The R group, the R' group and/or the X group, then comprises a group chosen from at least one hydrocarbon chain of at least 4 carbon atoms, at least one aliphatic ring of 3 to 8 atoms, at least one condensed polycyclic system which is aliphatic, partially aromatic or wholly aromatic, each ring comprising 5 or 6 atoms, alone or in a mixture.

Preferably, the X group represents a saturated linear hydrocarbon chain comprising 1 to 22 carbon atoms. Preferably, the X group is chosen from the $C_2H_4$, $C_3H_6$ groups.

The X group can also be a cyclohexyl group or a phenyl group, the R—(NH)$_n$CONH— and NHCO(NH)$_n$—R'— radicals can then be in ortho, meta or para position. Moreover, they can be in cis or trans position with respect to one another. Moreover, when the X radical is cyclic, this ring can be substituted by groups other than the two main R—(NH)$_n$CONH— and —NHCO(NH)$_n$—R' groups.

The X group can also comprise two or more condensed or non-condensed aliphatic and/or aromatic rings. Thus, according to a preferred variant of the invention, the X group is a group comprising two aliphatic rings linked by an optionally substituted $CH_2$ group such as for example:

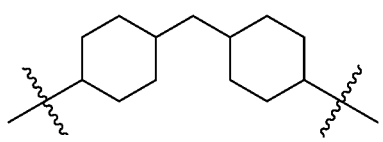 [SMILES: *C1CCC(CC2CCC(*)CC2)CC1]

According to another variant of the invention, the X group is a group comprising two aromatic rings linked by an optionally substituted $CH_2$ group such as for example:

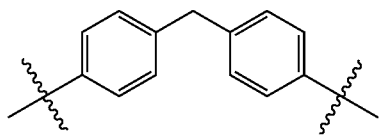 [SMILES: *c1ccc(Cc2ccc(*)cc2)cc1]

Among the preferred organogelators according to the invention, there can be mentioned the hydrazide derivatives corresponding to the following formulae:

$C_5H_{11}$—CONH—NHCO—$C_5H_{11}$
$C_9H_{19}$—CONH—NHCO—$C_9H_{19}$
$C_{11}H_{23}$—CONH—NHCO—$C_{11}H_{23}$
$C_{17}H_{35}$—CONH—NHCO—$C_{17}H_{35}$
$C_{21}H_{43}$—CONH—NHCO—$C_{21}H_{43}$

There the diamides can also be mentioned, of which a preferred diamide is N,N'-ethylenedi(stearamide), $C_{17}H_{35}$—CONH—$CH_2$—$CH_2$—NHCO—$C_{17}H_{35}$.

Other preferred compounds are ureide derivatives, of which one particular urea, 4.4'-bis(dodecylaminocarbonylamino) diphenylmethane has the formula:

$C_{12}H_{25}$—NHCONH—$C_6H_4$—$CH_2$—$C_6H_4$—NH-CONH—$C_{12}H_{25}$.

Still according to the invention the organogelator can contain organogelling molecules of formula (II) below:

$$(R-NH-CO)_x-Z-(NH-CO-R')_y \quad (II)$$

in which:
R and R', identical or different, contain a linear, branched or cyclic, saturated or unsaturated hydrocarbon chain comprising 1 to 22 carbon atoms, optionally substituted, and optionally comprising heteroatoms, rings and/or heterocycles;
Z represents a tri-functionalized group chosen from the following groups:

$Z_1$

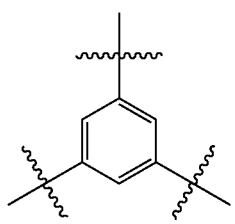

$Z_2$

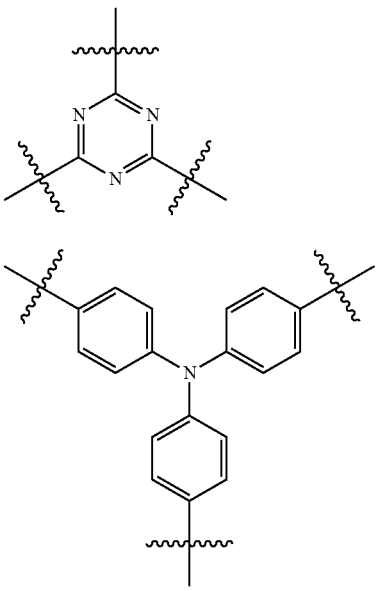

x and y are different integers with a value varying from 0 to 3 and such that x+y=3.

Among the preferred compounds corresponding to formula (II), there can be mentioned, when x is equal to 0 and Z represents $Z_2$, N2, N4, N6-tridecylmelamine having the following formula with R' representing the $C_9H_{19}$ group:

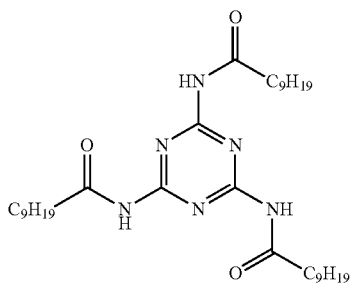

Other preferred compounds corresponding to formula (II), are such that x is equal to 0, Z represents $Z_2$ and R' represents a linear, saturated hydrocarbon chain of 1 to 22 carbon atoms, preferably 2 to 18 carbon atoms, preferably 5 to 12 carbon atoms. Other preferred compounds corresponding to formula (II), are such that y is equal to 0 and Z represents $Z_1$, the compounds then have the formula:

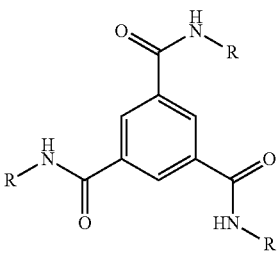

with R chosen from the following groups alone or mixtures

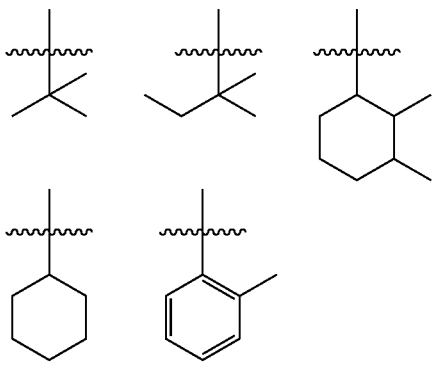

Other preferred compounds corresponding to formula (II), are such that y is equal to 0, Z represents $Z_1$ and R represents a linear, saturated hydrocarbon chain of 1 to 22 carbon atoms, preferably 8 to 12 carbon atoms.

Still according to the invention, the organogelator comprises sorbitol derivatives (III) and in particular, I,3:2,4-Di-O-benzylidene-D-sorbitol. By sorbitol derivative is meant any reaction product obtained from sorbitol. In particular, any reaction product obtained by reacting an aldehyde with sorbitol. By this condensation reaction, sorbitol acetals, which are sorbitol derivatives, are obtained. I,3:2,4-Di-O-benzylidene-D-sorbitol is obtained by reacting 1 mole of D-sorbitol and 2 moles of benzaldehyde and has the formula:

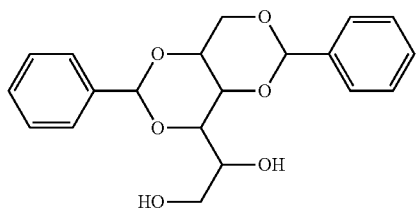 [SMILES: OCC(O)C1OC(c2ccccc2)OC2COC(c3ccccc3)OC21]

The sorbitol derivatives can thus be all aldehyde condensation products, in particular aromatics with sorbitol. Sorbitol derivatives will then be obtained with the general formula:

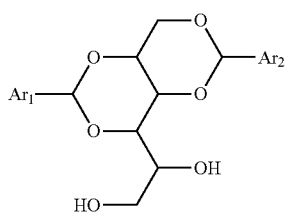

Where $Ar_1$ and $Ar_2$ are optionally substituted aromatic rings.

Among the sorbitol derivatives, apart from I,3:2,4-Di-O-benzylidene-D-sorbitol there can be found for example 1,3:2,4:5,6-tri-O-benzylidene-D-sorbitol, 2,4-mono-O-benzylidene-D-sorbitol, I,3:2,4-bis(p-methylbenzylidene) sorbitol, I,3:2,4-bis(3,4-dimethylbenzylidene) sorbitol, I,3:2,4-bis(p-ethylbenzylidene) sorbitol, I,3:2,4-bis(p-propylbenzylidene) sorbitol, I,3:2,4-bis(p-butylbenzylidene) sorbitol, I,3:2,4-bis(p-ethoxylbenzylidene) sorbitol, I,3:2,4-bis(p-chlorobenzylidene) sorbitol, I,3:2,4-bis(p-bromobenzylidene) sorbitol, I,3:2,4-Di-O-methylbenzylidene-D-sorbitol, I,3:2,4-Di-O-dimethylbenzylidene-D-sorbitol, I,3:2,4-Di-O-(4-methylbenzylidene)-D-sorbitol, I,3:2,4-Di-O-(4,3-dimethylbenzylidene)-D-sorbitol. Instead of sorbitol, the use of any other polyalcohol such as for example, xylitol, mannitol and/or ribitol could be envisaged.

Still according to the invention, other organogelators contain organogelling molecules of general formula (IV), with R" a linear or branched, saturated or unsaturated chain comprising 4 to 68 carbon atoms, preferably 4 to 54 carbon atoms, more preferentially 4 to 36 carbon atoms and z an integer varying from 2 to 4: $R''\text{---}(COOH)_z$ (IV). The organogelators corresponding to formula (IV) can be diacids (z=2), triacids (z=3) or tetracids (z=4). The preferred organogelators are diacids with z=2. Similarly, the R" group is preferably a saturated linear chain of formula $C_wH_{2w}$ with w an integer varying from 4 to 22, preferably from 4 to 12. Preferably, the diacids have the general formula $HOOC\text{---}C_wH_{2w}\text{---}COOH$ with w an integer varying from 4 to 22, preferably from 4 to 12 and where z=2 and $R''=C_wH_{2w}$.

The preferred diacids are the following:

adipic acid or 1,6-hexanedioic acid with w=4 pimelic acid or 1,7-heptanedioic acid with w=5 suberic acid or 1,8-octanedioic acid with w=6 azelaic acid or 1,9-nonanedioic acid with w=7 sebacic acid or 1,10-decanedioic acid with w=8 undecanedioic acid with w=9

1,2-dodecanedioic acid with w=10 tetradecanedioic acid with w=12

The diacids can also be diacid dimers of unsaturated fatty acid(s) i.e. dimers formed from at least one unsaturated fatty acid, for example from a single unsaturated fatty acid or from two different unsaturated fatty acids. The diacid dimers of unsaturated fatty acid(s) are in a standard fashion obtained by intermolecular dimerization reaction of at least one unsaturated fatty acid (Diels Alder reaction for example). Preferably, a single type of unsaturated fatty acid is dimerized. They are derived in particular from the dimerization of an unsaturated fatty acid, in particular $C_8$ to $C_{34}$, in particular $C_{12}$ to $C_{22}$, in particular $C_{10}$ to $C_{20}$, and more particularly $C_{18}$. A preferred fatty acid dimer is obtained by dimerization of linoleic acid, the latter then being able to be partially or totally hydrogenated. Another preferred fatty acid dimer has the formula $HOOC\text{---}(CH_2)_7\text{---}CH\text{=}CH\text{---}(CH_2)_7\text{---}COOH$. Another preferred fatty acid dimer is obtained by dimerization of methyl linoleate. In the same way, it is possible to find fatty acid triacids and fatty acid tetracids, obtained respectively by trimerization and tetramerization of at least one fatty acid.

Other organogelators contain organogelling molecules of general formula (V) below:

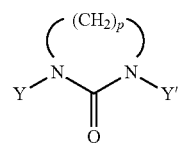

The Y and Y' groups represent independently of each other, an atom or group chosen from: H, $\text{---}(CH_2)_q\text{---}CH_3$, $\text{---}(CH_2)_q\text{---}NH_2$, $\text{---}(CH_2)_q\text{---}OH$, $\text{---}(CH_2)_q\text{---}COOH$ or

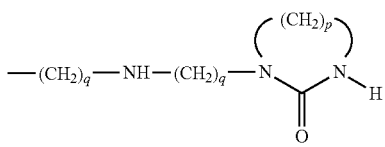

with q an integer varying from 2 to 18, preferably 2 to 10, preferably 2 to 4 and p an integer greater than or equal to 2, preferably having a value of 2 or 3.

Among the preferred organogelators corresponding to formula (V), there can be mentioned the following compounds:

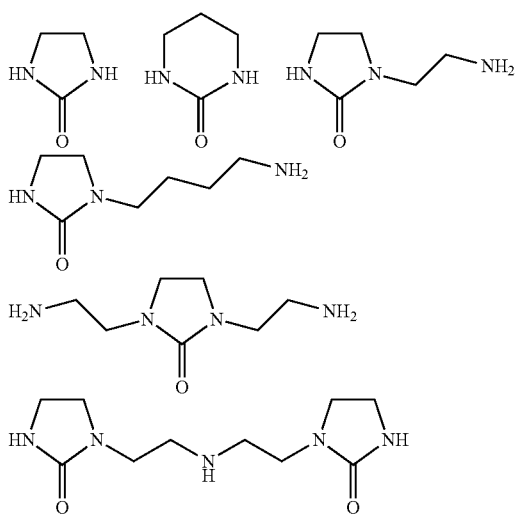

Still according to the invention, other organogelators contain organogelling molecules of general formula (VI) R—NH—CO—CO—NH—R', with R and R', identical or different, which represent a linear, branched or cyclic, saturated or unsaturated hydrocarbon chain comprising 1 to 22 carbon atoms, optionally substituted, and optionally comprising heteroatoms, rings and/or heterocycles. Preferably, R and R', identical or different, represent a linear, saturated hydrocarbon chain comprising 1 to 22 carbon atoms, preferably 8 to 12 carbon atoms.

Still according to the invention the organogelator can also contain organogelling molecules which do not all have the same chemical structure. Thus according to the invention, the organogelator (VII) can contain at least two types of organogelling molecules having a different chemical structure. When there are two types of organogelling molecules, the three units A, D and C are found throughout the organogelator constituted by organogelling molecules of different chemical structure, but distributed differently over these two types of organogelling molecules. Thus if a type $T_1$ of organogelling molecules and a second type $T_2$ are considered, $T_1$ can contain the units A and C and $T_2$ the unit D. It is also possible to have the combination D+C in a first type $T_1$ of organogelling molecules and A in a second type $T_2$ of organogelling molecules. It is also possible to envisage a first type $T_1$ having the three units A, D, C and a second type $T_2$ also having the three units A, C, D but based on a different chemical structure. The three units not being of the same chemical nature or not distributed in the same way over $T_1$ and $T_2$.

Among these organogelators (VII) comprising two types of organogelling molecules, there can be mentioned the combinations of the derivatives chosen from the amine derivatives, aminopyrimidine derivatives or phenol derivatives combined with molecules chosen from the carboxylic acid derivatives, barbituric acid derivatives or sulphosuccinate derivatives. Preferably, there can be mentioned the combinations:

of amine derivatives combined with carboxylic acid derivatives, of aminopyrimidine derivatives combined with barbituric acid derivatives, of phenol derivatives combined with sulphosuccinate derivatives.

Among these combinations there can be mentioned in particular the combination of 5-octyl-2,4,6-triammopyrimidine and 5,5-dioctylbarbituric acid or the combination of 5-octyl-2,4,6-triaminopyrimidine and barbituric acid.

There can also be mentioned the combinations of 2-naphthol or tannic acid or lauryl gallate with the sodium salts of dioctyl sulphosuccinate or dihexyl sulphosuccinate. The scope of the invention will not be exceeded by combining several different molecules such as those previously mentioned and in particular the molecules described in formulae (I), (II), (III), (IV), (V), (VI) and (VII). According to a preferred embodiment of the invention the organogelling molecules have a molar mass less than or equal to 2000 gmol$^{-1}$ and preferably less than or equal to 1000 gmol$^{-1}$.

The rupture temperature $T_R$ at which the network of hydrogen bonds disappears is a function of the number and strength of the bonds created within the organogelator and is consequently a function of the chemical structure of the organogelling molecules and the concentration of the organogelator in the bitumen. The rupture temperature $T_R$ is according to the invention comprised between 40° C. and 120° C. These temperatures were determined experimentally by measuring the ring and ball softening temperature as defined in the standard NF EN 1427. It was possible to correlate these rupture temperatures with the disappearance of the hydrogen bonds by means of infrared spectroscopy which made it possible to monitor the development of the intensity of the absorption bands corresponding to the hydrogen bonds present in the organogelator at the different test temperatures.

The bituminous compositions according to the invention are constituted by a major proportion of bitumen and a minor proportion of organogelator. The organogelator represents 0.1 to 5.0% by weight with respect to the weight of bitumen. A quantity of less than 0.1% by weight of organogelator could be insufficient to obtain a bituminous composition according to the invention, as the organogelling molecules would be too far away from each other to bind together; whereas a quantity greater than 5.0% by weight of organogelator may not be necessary, as the organogelator acts at a low dose. According to a preferred implementation, the organogelator represents 0.5 to 3% by weight with respect to the weight of bitumen, and better still, 1 to 2% by weight with respect to the weight of bitumen.

The bituminous compositions according to the invention can contain bitumens of different origins. There can be mentioned firstly the bitumens of natural origin, those contained in deposits of natural bitumen, natural asphalt or bituminous sands. The bitumens according to the invention are also the bitumens originating from the refining of crude oil. The bitumens originate from the atmospheric and/or vacuum distillation of oil. These bitumens being able to be optionally blown, visbroken and/or de-asphalted. The bitumens can be bitumens of hard or soft grade. The different bitumens obtained by the refining processes can be combined with each other in order to obtain the best technical compromise.

The bitumens used can also be bitumens fluxed by adding volatile solvents, fluxes of oil origin, carbochemical fluxes and/or fluxes of vegetable origin. The bitumens used can also be special bitumens such as the bitumens modified by the addition of polymers. By way of examples of polymers for bitumen, there can be mentioned elastomers such as the copolymers SB, SBS, SIS, SBS*, SBR, EPDM, polychloroprene, polynorbonene and optionally polyolefins such as polyethylenes PE, PEND, polypropylene PP, plastomers such as EVA, EMA, copolymers of olefins and unsaturated carboxylic esters EBA, elastomeric polyolefin copolymers, polybutene-type polyolefins, copolymers of ethylene and acrylic, methacrylic acid or maleic anhydride esters, copolymers and terpolymers of ethylene and glycidyl methacrylate, ethylene-propylene copolymers, rubbers, polyisobutylenes, SEBSs, ABSs.

Other additives can also be added to a bitumen base according to the invention. These are for example vulcanization agents and/or cross-linking agents capable of reacting with a polymer, when an elastomer and/or a plastomer, which can be functionalized and/or can comprise reactive sites, is involved. Among the vulcanization agents there can be mentioned those which are based on sulphur and its derivatives, used to cross-link an elastomer at levels of 0.01% to 30% with respect to the weight of elastomer.

Among the cross-linking agents there can be mentioned cationic cross-linking agents such as mono- or polyacids, or carboxylic anhydrides, carboxylic acid esters, sulphonic, sulphuric, phosphoric acids, even acid chlorides, phenols, at levels of 0.01% to 30% with respect to the polymer. These agents are capable of reacting with the elastomer and/or the functionalized plastomer. They can be used to complement or replace vulcanization agents.

Various uses of the bituminous compositions obtained according to the invention are envisaged, in particular for the preparation of a bituminous binder, which can in turn be used for preparing a combination with aggregates, in particular road aggregates. Another aspect of the invention is the use of a bituminous composition in various industrial applications, in particular for preparing a sealing membrane, membrane or impregnation layer. With regard to highway applications, the invention relates in particular to bituminous mixes as materials for the construction and maintenance of road foundations and their surfacing, as well as for carrying out all road works. Thus, the invention relates for example to surface dressings, hot mixes, cold mixes, cold-cast mixes, gravel emulsions, base, binder, bonding and wearing courses, and other combinations of a bituminous binder and highway aggregate having particular properties such as anti-rutting courses, draining mixes, or asphalts (mixture of a bituminous binder and sand-type aggregates). With regard to the industrial applications of the bituminous compositions, the following can be mentioned: the manufacture of sealing membranes, anti-noise membranes, insulating membranes, surface coatings, carpet tiles, impregnation layers, etc.

The invention also relates to a method for obtaining a bituminous composition which is hard at the temperatures of use without increasing its viscosity when hot. The organogelator can equally well be introduced into the bitumen alone, or during manufacture, into the polymer bitumen, into the bituminous binder, into the binder in the anhydrous form or in the form of a bituminous mix, but always when hot to temperatures varying from 140 to 180° C. The mixtures can then be stirred at these temperatures until solubilization of the organogelator in the bitumen, the polymer bitumen, the bituminous binder, the binder in the anhydrous form or in the form of a bituminous mix.

EXAMPLES

The invention is illustrated by the following non-limitative examples. The rheological and mechanical characteristics of the bitumens or of the bitumen-organogelator compositions to which reference is made in these examples are measured as indicated in Table 1. Moreover, the Brookfield viscosity is expressed in mPa·s. The viscosity is measured using a Brookfield CAP 2000+viscometer. It is measured at 140 and 160° C. and at a speed of rotation of 300 rpm. The measurement is read after 30 seconds for each temperature.

TABLE 1

| Property | Abbreviation | Unit | Measurement standard |
|---|---|---|---|
| Needle penetrability at 25° C. | $P_{25}$ | 1/10 mm | NF EN 1426 |
| Ring and ball softening point | RBSP | ° C. | NF EN 1427 |
| Brookfield viscosity | — | Mpa·s | Cf. examples |

Example 1

Preparation of a Bitumen/Organogelator Composition of Formula (I)

This first example relates to bitumen+organogelator compositions of general formula (I) according to the invention. Five types of organogelling molecules have been used in this example, at different concentrations. Their chemical structures are as follows:

$$C_5H_{11}\text{—CONH—NHCO—}C_5H_{11} \qquad (1)$$

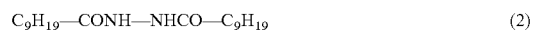
$$C_9H_{19}\text{—CONH—NHCO—}C_9H_{19} \qquad (2)$$

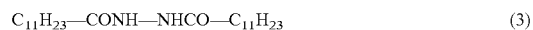
$$C_{11}H_{23}\text{—CONH—NHCO—}C_{11}H_{23} \qquad (3)$$

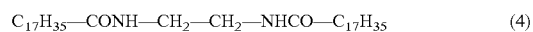
$$C_{17}H_{35}\text{—CONH—}CH_2\text{—}CH_2\text{—NHCO—}C_{17}H_{35} \qquad (4)$$

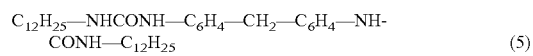
$$C_{12}H_{25}\text{—NHCONH—}C_6H_4\text{—}CH_2\text{—}C_6H_4\text{—NHCONH—}C_{12}H_{25} \qquad (5)$$

The preparations are produced at 160-170° C., in a reactor with stirring. The control bitumen $C_1$ is introduced into the reactor first. Then, the organogelator is added. The mixtures are stirred for approximately 60 minutes. Their final appearance is homogeneous. The mixtures are cooled down to ambient temperature. The control bitumen $C_1$ is a direct distillation bitumen of grade 70-100 the characteristics of which correspond to the standard NF EN 12591.

TABLE 2

| Compositions | Nature of the organogelator | Organogelator concentration |
|---|---|---|
| $C_1$ (control) | — | 0% |
| $C_2$ | (1) | 1% |
| $C_3$ | (1) | 2% |
| $C_4$ | (1) | 3% |
| $C_5$ | (2) | 2% |
| $C_6$ | (2) | 3% |
| $C_7$ | (3) | 2% |
| $C_8$ | (3) | 3% |
| $C_9$ | (3) | 4% |
| $C_{10}$ | (4) | 2% |
| $C_{11}$ | (4) | 3% |
| $C_{12}$ | (5) | 3% |

Determination of the Rupture Temperature $T_R$ by Infrared Spectroscopy

In order to carry out the measurements, a drop is taken from the preheated and applied to a KBr pellet, then the KBr pellet is scraped onto a glass slide in order to obtain a relatively translucid "film". The IR device used is a Nicolet Avatar 320 spectrometer, the temperature controller is a (P/N21525) from Specac. At different temperatures, the evolution of the absorption bands of the groups involved in the hydrogen bonds is monitored.

For the particular $C_6$ composition, the spectra of FIG. 1 are obtained.

Figure 2:
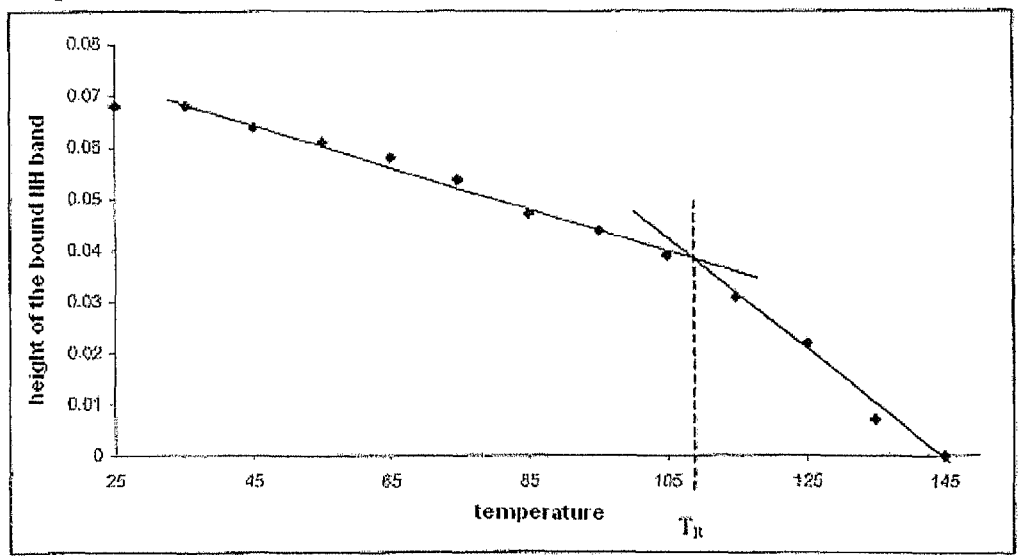
FIG. 2 is a graph showing the rupture temperature of composition $C_6$.

The more the temperature increases, the lower the intensity of the band around 3200 cm$^{-1}$ of the bound NHs. Taking the intensity of the bound NH band as a function of temperature, the graph of FIG. 2 is obtained which gives us the rupture temperature $T_R$=105° C. of the composition $C_6$.

For the $C_4$ composition, the rupture temperature $T_R$ obtained is 85° C.

For the $C_8$ composition, the rupture temperature $T_R$ obtained is 105° C.

These rupture temperatures are also determined by measuring the ring and ball softening temperature. The results are reported in Table 3 below:

Determination of the Physical Properties of the Bitumen+Organogelator Compositions

TABLE 3

| Compositions | Penetrability $P_{25}$ | Ring and ball softening point (RBSP) | Pfeiffer index PI | Viscosity at 140° C. | Viscosity at 160° C. |
|---|---|---|---|---|---|
| $C_1$ (control) | 76 | 46.6 | −1.0 | 267 | 165 |
| $C_2$ | 62 | 48.4 | −1.1 | 261 | 160 |
| $C_3$ | 51 | 70.8 | 3.0 | 255 | 158 |
| $C_4$ | 46 | 86.4 | 4.9 | 250 | 155 |
| $C_5$ | 55 | 81.4 | 4.8 | 242 | 153 |
| $C_6$ | 52 | 105.2 | 7.4 | 228 | 148 |
| $C_7$ | 55 | 80.6 | 4.7 | 240 | 151 |
| $C_8$ | 50 | 102.6 | 6.9 | 232 | 147 |
| $C_9$ | 47 | 111.0 | 7.5 | 224 | 145 |
| $C_{10}$ | 58 | 91.0 | 6.1 | 225 | 145 |
| $C_{11}$ | 55 | 96.5 | 6.5 | 203 | 144 |
| $C_{12}$ | 69 | 52.2 | 0.14 | 298 | 173 |

The needle penetrability, measured at 25° C., is expressed in 1/10 mm.

The ring and ball softening point is expressed in ° C.

The Pfeiffer penetration index PI is defined by the following calculation formula:

$$IP = \frac{1952 - 500 \times \log(P_{25}) - 20 \times RBSP}{50 \times \log(P_{25}) - RBSP - 120}$$

The viscosity, measured at 160° C., is expressed in mPa s$^{-1}$.

As shown by the results in Table 3, the correlation between the softening temperatures and the temperature of the disappearance of the IR bands corresponding to the hydrogen bonds for the examples $C_6$ and $C_4$ is established as the rupture temperatures are virtually identical to the softening temperatures.

Moreover, whatever the organogelator used, its action is equivalent. It is characterized by a reduction in the penetrability $P_{25}$, an increase in the ring and ball temperature and an increase in the Pfeiffer index. This reflects a greater hardness and consistency of the bitumen bases with the different organogelators added.

Similarly, the higher the organogelator concentration, the greater the hardness and consistency of the bitumen. A greater network of hydrogen bonds increases the hardness of the bitumen at the temperatures of use.

Finally, the viscosities at a given temperature of the bitumen alone and the bitumen with additives are equivalent. The addition of organogelator makes it possible to harden the bituminous composition without increasing the viscosity of the bituminous composition when hot.

Example 2

Preparation of a Bitumen/Organogelator Composition with Organogelling Molecules of a Different Nature (VII)

The compositions are prepared in the same way as in example 1. The organogelator concentration is 3%. The organogelator (for example $C_{13}$ or $C_{14}$) is constituted by a first type $T_1$ of organogelling molecules ($A_1$) and by a second type $T_2$ of organogelling molecules ($B_1$ or $B_2$). The molar ratio of the two types $T_1$ and $T_2$ is 1 to 1.

Aminopyrimidine+barbituric acid

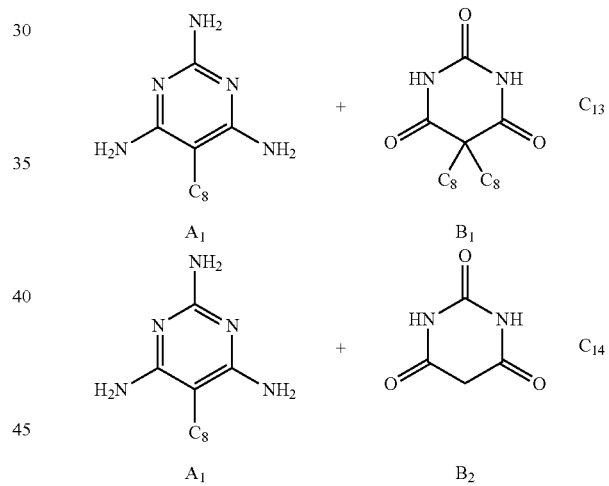

The composition $C_{13}$ comprises an aminopyrimidine derivative $A_1$, 5-octyl-2,4,6-triaminopyrimidine and a barbituric acid derivative $B_1$, 5,5-dioctylbarbituric acid. The $C_{14}$ composition comprises an aminopyrimidine derivative $A_1$, 5-octyl-2,4,6-triaminopyrimidine and barbituric acid $B_2$.

TABLE 4

| Compositions | Penetrability $P_{25}$ | Ring and ball softening point (RBSP) | Pfeiffer index PI | Viscosity at 140° C. | Viscosity at 160° C. |
|---|---|---|---|---|---|
| $C_1$ | 76 | 47.5 | −0.8 | 267 | 165 |
| $C_{13}$ | 59 | 52.0 | −0.31 | 276 | 168 |
| $C_{14}$ | 61 | 52.5 | −0.11 | 311 | 186 |

Phenol+sulphosuccinate

The $C_{15}$ composition comprises the sodium salt of dioctyl sulphosuccinate and tannic acid. The $C_{16}$ composition comprises the sodium salt of dihexyl sulphosuccinate and tannic acid. The $C_{17}$ composition comprises the sodium salt of dihexyl sulphosuccinate and lauryl gallate. The $C_{18}$ composition comprises the sodium salt of dihexyl sulphosuccinate and 2-naphthol.

TABLE 5

| Compositions | Penetrability $P_{25}$ | Ring and ball softening point (RBSP) | Pfeiffer index PI | Viscosity at 140° C. | Viscosity at 160° C. |
| --- | --- | --- | --- | --- | --- |
| $C_1$ | 76 | 47.5 | −0.8 | 267 | 165 |
| $C_{15}$ | 71 | 52.2 | 0.2 | 277 | 163 |
| $C_{16}$ | 60 | 52.8 | −0.08 | 253 | 144 |
| $C_{17}$ | 70 | 50.8 | −0.17 | 268 | 164 |
| $C_{18}$ | 68 | 51.4 | −0.09 | 267 | 164 |

Conclusions identical to those of example 1 can be drawn.

Example 3

Preparation of a Bitumen/Organogelator Composition with a Sorbitol Derivative (III) 1,3:2,4-Di-O-benzylidene-D-sorbitol (DBS) as Organogelator The compositions are prepared in the same way as in example 1. The organogelator is used at different concentrations.

TABLE 6

| Compositions | Organogelator concentration |
| --- | --- |
| $C_1$ (control) | 0% |
| $C_{19}$ | 3% |
| $C_{20}$ | 1% |
| $C_{21}$ | 0.66% |
| $C_{22}$ | 0.33% |
| $C_{23}$ | 0.1% |

The results obtained are recorded in Table 7 below:

TABLE 7

| Compositions | Penetrability $P_{25}$ | Ring and ball softening point (RBSP) | Pfeiffer index PI | Viscosity at 140° C. | Viscosity at 160° C. |
| --- | --- | --- | --- | --- | --- |
| $C_1$ (control) | 76 | 46.6 | −1.0 | 267 | 165 |
| $C_{19}$ | 36 | 161 | 10 | 310 | 125 |
| $C_{20}$ | 39 | 143.5 | 9.31 | 314 | 118 |
| $C_{21}$ | 46 | 131.5 | 8.95 | 298 | 115 |
| $C_{22}$ | 55 | 94 | 6.28 | 257 | 113 |
| $C_{23}$ | 74 | 47.8 | −0.82 | 253 | 111 |

It is noted that the addition of DBS makes it possible to significantly increase the ring and ball temperature of the compositions even at low DBS concentrations (see for example $C_{22}$). The penetrability also reduces with the addition of DBS. The viscosities at 140° C. and 160° C. of the compositions with additives are equivalent to those of the bitumen alone.

Example 4

Preparation of a Bitumen/organogelator Composition of Formula (IV)

The compositions are prepared in the same way as in example 1. The different organogelators in Table 8 are used.

TABLE 8

| Compositions | Nature of the organogelator | Organogelator concentration |
| --- | --- | --- |
| $C_1$ (control) | — | 0% |
| $C_{24}$ | HOOC—$(CH_2)_4$—COOH | 3% |
| $C_{25}$ | HOOC—$(CH_2)_5$—COOH | 3% |
| $C_{26}$ | HOOC—$(CH_2)_6$—COOH | 3% |
| $C_{27}$ | HOOC—$(CH_2)_7$—COOH | 3% |
| $C_{28}$ | HOOC—$(CH_2)_8$—COOH | 3% |
| $C_{29}$ | HOOC—$(CH_2)_9$—COOH | 3% |
| $C_{30}$ | HOOC—$(CH_2)_{10}$—COOH | 3% |
| $C_{31}$ | HOOC—$(CH_2)_{12}$—COOH | 3% |

TABLE 9

| Compositions | Penetrability $P_{25}$ | Ring and ball softening point (RBSP) | Pfeiffer index PI | Viscosity at 140° C. | Viscosity at 160° C. |
| --- | --- | --- | --- | --- | --- |
| $C_1$ (control) | 76 | 46.6 | −1.0 | 267 | 165 |
| $C_{24}$ | 52 | 68.8 | 2.73 | 280 | 114 |
| $C_{25}$ | 57 | 64.4 | 2.21 | 250 | 108 |
| $C_{26}$ | 55 | 77.5 | 4.23 | 242 | 104 |
| $C_{27}$ | 37 | 103.6 | 6.22 | 223 | 100 |
| $C_{28}$ | 39 | 104.8 | 6.46 | 225 | 97 |
| $C_{29}$ | 35 | 106.3 | 6.34 | 220 | 97 |
| $C_{30}$ | 29 | 110.5 | 6.28 | 217 | 95 |
| $C_{31}$ | 28 | 110 | 6.16 | 217 | 96 |

With the diacids, the viscosities of the compositions are equivalent and even less than that of the bitumen alone. At ambient temperature, the compositions according to the invention are clearly harder than the bitumen alone. When hot, the compositions according to the invention have a ring and ball temperature clearly higher than that of the bitumen alone.

Example 5

Preparation of a Bitumen/Organogelator Composition with a Sorbitol Derivative (III), 1,3:2,4-bis-(p-methylbenzylidene)-sorbitol (MDBS) as Organogelator The compositions are prepared in the same way as in example 1. MDBS at different concentrations (Table 10) is used. 1,3:2,4-Di-O-(4,3-methylbenzylidene)-D-sorbitol (MDBS) has the formula:

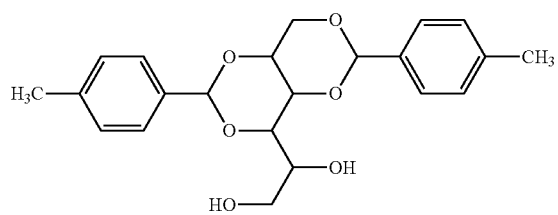

TABLE 10

| Compositions | Organogelator concentration |
| --- | --- |
| $C_1$ (control) | 0% |
| $C_{32}$ | 3% |
| $C_{33}$ | 1% |
| $C_{34}$ | 0.66% |
| $C_{35}$ | 0.5% |

The results obtained are recorded in Table 11 below:

TABLE 11

| Compositions | Penetrability $P_{25}$ | Ring and ball softening point (RBSP) | Pfeiffer index PI | Viscosity at 140° C. | Viscosity at 160° C. |
|---|---|---|---|---|---|
| $C_1$ (control) | 76 | 46.6 | −1.0 | 267 | 165 |
| $C_{32}$ | 63 | 57 | 1.0 | — | — |
| $C_{33}$ | 50 | 85 | 4.97 | 301 | 130 |
| $C_{34}$ | 48 | 95 | 6.9502 | 286 | 124 |
| $C_{35}$ | 52 | 85 | 5.08 | 291 | 126 |

It is noted that the addition of MDBS makes it possible to increase the ring and ball temperature of the compositions. The penetrability also reduces with the addition of the MDBS. The viscosities at 140° C. and 160° C. of the compositions with additives are equivalent to those of the bitumen alone.

Example 6

Preparation of a Bitumen/Organogelator Composition of Formula (II)

The compositions are prepared in the same way as in example 1. Four organogelators corresponding to formula (II) are used:

Irgaclear XT386 sold by Ciba (y equal to 0, Z being the $Z_1$ group), at the following concentrations (Table 12):

TABLE 12

| Compositions | Organogelator concentration |
|---|---|
| $C_1$ (control) | 0% |
| $C_{36}$ | 3% |
| $C_{37}$ | 1% |
| $C_{38}$ | 0.66% | a compound of formula:

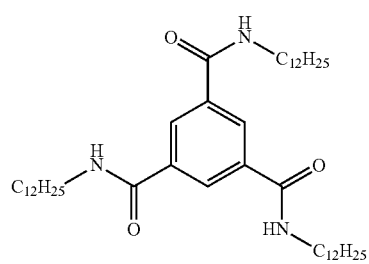

With y equal to 0, Z being the Z group; and R the $C_{12}H_{25}$ group, at a concentration of 3% by mass ($C_{39}$).

a compound of formula:

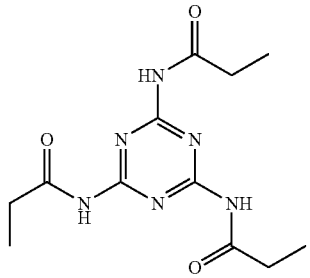 [SMILES: CCC(=O)Nc1nc(NC(=O)CC)nc(NC(=O)CC)n1]

With x equal to 0, Z being the $Z_2$ group and R' the $C_2H_5$ group, at a concentration of 3% by mass ($C_{40}$).

a compound of formula:

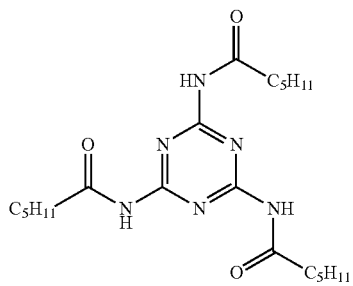

With x equal to 0, Z being the $Z_2$ group and R' the $C_5H_{11}$ group, at a concentration of 3% by mass ($C_{41}$).

The results are recorded in Table 13 below:

TABLE 13

| Compositions | Penetrability $P_{25}$ | Ring and ball softening point (RBSP) | Pfeiffer index PI | Viscosity at 140° C. | Viscosity at 160° C. |
|---|---|---|---|---|---|
| $C_1$ (control) | 76 | 46.6 | −1.0 | 267 | 165 |
| $C_{36}$ | 57 | 55.0 | −0.29 | — | — |
| $C_{37}$ | 66 | 52.5 | 0.09 | 310 | 137 |
| $C_{38}$ | 72 | 48.8 | −0.62 | 288 | 128 |
| $C_{39}$ | 52 | 95 | 6.23 | 279 | 103 |
| $C_{40}$ | 68 | 48.8 | −0.77 | 292 | 131 |
| $C_{41}$ | 72 | 48.5 | −0.70 | 282 | 114 |

With the organogelators of formula (II), the viscosities of the compositions are equivalent and even less than that of the bitumen alone. At ambient temperature, the compositions according to the invention are harder than the bitumen alone. When hot, the compositions according to the invention have a ring and ball temperature higher than those of the bitumen alone.

Example 7

Preparation of a Bitumen/Organogelator Composition of Formula (VI)

The compositions are prepared in the same way as in example 1. Two organogelators corresponding to formula (VI) are used:
$C_{12}H_{25}$—NH—CO—CO—NH—$C_{12}H_{25}$ (concentration 2%, $C_{42}$)
$C_8H_{17}$—NH—CO—CO—NH—$C_8H_{17}$ (concentration 3%, $C_{43}$)

TABLE 14

| Compositions | Penetrability $P_{25}$ | Ring and ball softening point (RBSP) | Pfeiffer index PI | Viscosity at 140° C. | Viscosity at 160° C. |
|---|---|---|---|---|---|
| $C_1$ (control) | 76 | 46.6 | −1.0 | 267 | 165 |
| $C_{42}$ | 74 | 50 | −0.22 | 204 | 92 |
| $C_{43}$ | 62 | 50 | −0.69 | 237 | 107 |

GENERAL CONCLUSION

The bitumen is hardened at the temperatures of use by the organogelator constituted by the same organogelling molecule or by two molecules of different chemical nature; the viscosity when hot not being increased relative to that of the bitumen with no additives.

What is claimed is:

1. A method for obtaining a thermoreversible bituminous composition which is hard at the temperature of use without increasing its viscosity measured at a temperature of 140° C., the method comprising introducing a minor proportion of at least one chemical additive to a major proportion of at least one bitumen, wherein the additive is a diacid chosen from the group consisting of pimelic acid, suberic acid, azelaic acid, sebacic acid, undecanedioic acid, 1,2-dodecanedioic acid or tetradecanedioic acid.

2. The method according to claim 1, wherein the additive is an organogelator.

3. The method according to claim 2, wherein the organogelator creates a network of hydrogen bonds between organogelling molecules.

4. The method according to claim 3, wherein the organogelator molecules have a molar mass of less than or equal to 2000 gmol$^{-1}$.

5. The method according to claim 3, wherein the organogelling molecules have a molar mass of less than or equal to 1000 gmol$^{-1}$.

6. The method according to claim 1, wherein the additive is present at 0.1 to 5% by mass with respect to the bitumen.

7. The method according to claim 1, wherein the bitumen also comprises at least one polymer and/or one flux.

8. The method according to claim 1, wherein the bitumen is chosen from the group consisting of atmospheric distillation residues, vacuum distillation residues, visbroken residues, blown residues, and mixtures and combinations thereof.

9. The method according to claim 1, wherein the bituminous composition is a bituminous binder selected from the group consisting of an anhydrous binder, a bituminous emulsion, a polymer bitumen, and a fluxed bitumen.

10. The method according to claim 9, wherein the major proportion of at least one bitumen includes a mixture with aggregates and the bituminous composition is for manufacturing a surface dressing, a hot mix, a cold mix, a cold-cast mix, a gravel emulsion or a wearing course.

11. A method for making a bituminous composition, comprising:
 a. transferring a bitumen and an organogelator to a reactor to generate a mixture, wherein the organogelator is a diacid chosen from the group consisting of pimelic acid, suberic acid, azelaic acid, sebacic acid, undecanedioic acid, 1,2-dodecanedioic acid or tetradecanedioic acid;
 b. heating the mixture at 140 to 180° C. with stirring until the mixture has a homogenous appearance; and
 c. cooling the mixture to ambient temperature to generate the bituminous composition,
 wherein the bituminous composition is thermoreversible and hard at the temperature of use without increasing its viscosity measured at a temperature of 140° C.

12. The method according to claim 11, wherein the organogelator is transferred when at temperatures from 140 to 180° C., either into the bitumen alone, into the bitumen modified or not modified by polymers, into the bitumen in the form of a bituminous binder, or into the bitumen when the bitumen is an anhydrous binder, bituminous mix, or surface dressing.

13. A method for making a bituminous composition, comprising
 a. transferring a bitumen to a reactor, the bitumen selected form the group consisting of a polymer bitumen, a non-polymer bitumen, a bituminous binder, an anhydrous bituminous binder, and a bituminous mix;
 b. transferring an organogelator heated to 140 to 180° C. to the bitumen to form a mixture, wherein the organogelator is chosen from the group consisting of pimelic acid, suberic acid, azelaic acid, sebacic acid, undecanedioic acid, 1,2-dodecanedioic acid or tetradecanedioic acid;
 d. stirring the mixture for approximately 60 minutes or until the mixture appears homogenous; and
 e. cooling the mixture to ambient temperature to generate the bituminous composition, wherein the bituminous composition is theremoreversible and hard or the temperature of use without increasing its viscosity at a temperature of 140° C.

14. A thermoreversible bituminous composition which is hard at the temperature of use without increasing its viscosity measured at a temperature of 140° C. comprising a minor proportion of a least one chemical additive chosen from the group consisting of pimelic acid, suberic acid, azelaic acid, sebacic acid, undecanedioic acid, 1,2-dodecanedioic acid or tetradecanedioic acid and a major proportion of a least one bitumen.

15. The thermorevesible bituminous composition of claim 11 wherein the bituminous binder is selected from the group consisting of an anhydrous binder, a bituminous emulsion, a polymer bitumen and a fluxed bitumen.

* * * * *